(12) United States Patent
Zhang

(10) Patent No.: US 9,295,102 B2
(45) Date of Patent: Mar. 22, 2016

(54) CALL METHOD OF TERMINAL AND TERMINAL USING CALL METHOD

(71) Applicant: Huawei Device Co., LTD, Shenzhen (CN)

(72) Inventor: Jinchang Zhang, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 196 days.

(21) Appl. No.: 14/066,205

(22) Filed: Oct. 29, 2013

(65) Prior Publication Data

US 2014/0051420 A1 Feb. 20, 2014

Related U.S. Application Data

(63) Continuation of application No. PCT/CN2012/081047, filed on Sep. 6, 2012.

(30) Foreign Application Priority Data

Sep. 6, 2011 (CN) .......................... 2011 1 0262765

(51) Int. Cl.
| | |
|---|---|
| *H04M 3/00* | (2006.01) |
| *H04W 24/00* | (2009.01) |
| *H04B 17/00* | (2015.01) |
| *H04W 88/06* | (2009.01) |
| *G10L 21/00* | (2013.01) |
| *G10L 21/0364* | (2013.01) |
| *G10L 21/034* | (2013.01) |
| *G10L 25/03* | (2013.01) |

(52) U.S. Cl.
CPC ............... *H04W 88/06* (2013.01); *G10L 21/00* (2013.01); *G10L 21/034* (2013.01); *G10L 21/0364* (2013.01); *G10L 25/03* (2013.01)

(58) Field of Classification Search
None
See application file for complete search history.

(56) References Cited

U.S. PATENT DOCUMENTS

| | | | | |
|---|---|---|---|---|
| 4,131,765 | A | * | 12/1978 | Kahn ............................ 704/205 |
| 5,577,117 | A | * | 11/1996 | Rabipour et al. ............. 379/414 |
| 6,052,462 | A | * | 4/2000 | Lu ............................ 379/406.08 |
| 2002/0154764 | A1 | | 10/2002 | Ahmad |
| 2003/0206624 | A1 | * | 11/2003 | Domer et al. ............ 379/406.01 |
| 2012/0095759 | A1 | * | 4/2012 | Hetherington et al. ........ 704/225 |

FOREIGN PATENT DOCUMENTS

| | | |
|---|---|---|
| CN | 1832516 A | 9/2006 |
| CN | 101304455 A | 11/2008 |
| CN | 101409744 A | 4/2009 |
| CN | 101719962 A | 6/2010 |
| CN | 101895894 A | 11/2010 |

(Continued)

OTHER PUBLICATIONS

First Office Action of Chinese Application No. 201110262765.9 mailed Nov. 29, 2012, 7 pages.

(Continued)

*Primary Examiner* — Erika A Washington
(74) *Attorney, Agent, or Firm* — Slater & Matsil, L.L.P.

(57) ABSTRACT

A call method of a terminal and a terminal using the call method, are provided to adjust voice quality of a call in real time. The method includes analyzing a spectral component of a voice signal during a call and selecting a corresponding frequency response channel according to an analysis result of the spectral component of the voice signal.

19 Claims, 3 Drawing Sheets

Analyze whether a low frequency component in a spectral component of a voice signal to be sent to a peer end is greater than a set low frequency limit — 301

Select a corresponding frequency response channel according to an analysis result — 302

(56) References Cited

FOREIGN PATENT DOCUMENTS

| | | |
|---|---|---|
| CN | 101977273 A | 2/2011 |
| CN | 102006128 A | 4/2011 |
| CN | 102291496 A | 12/2011 |
| EP | 1601171 A1 | 11/2005 |
| EP | 2592816 A1 | 5/2013 |
| EP | 2632064 A1 | 8/2013 |
| JP | 11231897 A | 8/1999 |
| WO | 0271731 A1 | 9/2002 |

OTHER PUBLICATIONS

International Search Report and Written Opinion of the International Searching Authority received in Patent Cooperation Treaty Application No. PCT/CN2012/081047, mailed Dec. 13, 2012, 11 pages.

* cited by examiner

CALL METHOD OF TERMINAL AND TERMINAL USING CALL METHOD

CROSS-REFERENCE TO RELATED APPLICATIONS

This application is a continuation of International Application No. PCT/CN2012/081047, filed on Sep. 6, 2012, which claims priority to Chinese Patent Application No. 201110262765.9, filed on Sep. 6, 2011, both of which are hereby incorporated by reference in their entireties.

TECHNICAL FIELD

The present invention relates to the field of communications technologies and, in particular embodiments, to a call method of a terminal and a terminal using the call method.

BACKGROUND

In the current communications industry, voice services are still main support services. Constantly improving voice quality of a call of a terminal user is an objective pursued by operators and manufacturers.

In an existing technology for improving voice quality of a call, different call scenario modes are preset in a terminal, and different call parameter combinations are set for each call scenario mode. The call parameter combination is one or a combination of at least two of microphone setting, handset setting, and echo suppression. A user selects a corresponding call scenario mode according to a call environment. Voice quality of a call in the call environment is improved through a call parameter combination in the selected call scenario mode.

In a process of implementing improvement of the voice quality of the call, the inventor finds that the prior art has at least one problem. Before a call and during the call, a user needs to select or change a call mode, which increases inconvenience of a call operation of the user.

SUMMARY OF THE INVENTION

Embodiments of the present invention provide a call method of a terminal and a terminal using the call method, which can adjust voice quality of a call at any time during a call of a user, and bring convenience to a call operation of the user.

In order to achieve the foregoing objectives, the embodiments of the present invention adopt the following technical solutions.

A call method of a terminal includes analyzing a spectral component of a voice signal during a call, and selecting a corresponding frequency response channel according to an analysis result of the spectral component of the voice signal.

A terminal includes an analyzing unit, configured to analyze a spectral component of a voice signal during a call. A selecting unit is configured to select a corresponding frequency response channel according to an analysis result of the spectral component of the voice signal.

In the call method of a terminal and the terminal using the call method that are provided by the embodiments of the present invention, during a call, a voice signal is processed at any time by using a frequency response channel of which a low frequency gain is smaller than a high frequency gain and a frequency response channel of which a low frequency gain is larger than a high frequency gain, so that high frequencies and low frequencies in the voice signal achieve a balance, so as to achieve a purpose of improving voice quality of a call. Therefore, a problem in the prior art that a user still needs to select or change a call mode before a call and during the call is avoided, which brings convenience to a call operation of the user.

BRIEF DESCRIPTION OF THE DRAWINGS

To illustrate the technical solutions in the embodiments of the present invention more clearly, the following briefly introduces accompanying drawings required for describing the embodiments. Apparently, the accompanying drawings in the following description merely show some embodiments of the present invention, and persons of ordinary skill in the art may still derive other drawings according to these accompanying drawings without creative efforts.

DETAILED DESCRIPTION OF ILLUSTRATIVE EMBODIMENTS

The technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

In the embodiments of the present invention, a user Equipment (UE) is taken as an example for illustration, and in an actual application, the user Equipment includes, but is not limited to, a fixed-line phone, a mobile phone, or an IP Internet phone.

Figure 1:
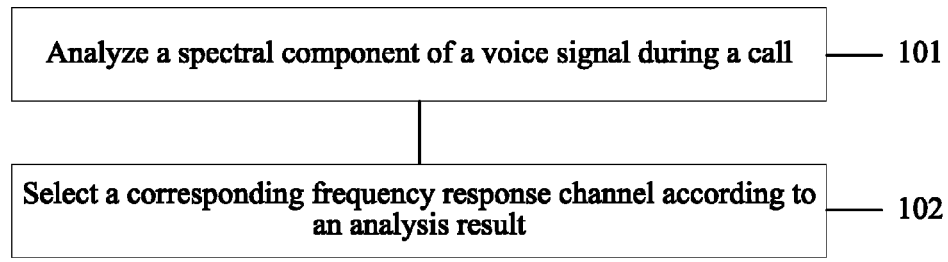
FIG. 1 is a flowchart of a call method of a terminal according to a first embodiment of the present invention.

A first embodiment of the present invention provides a call method of a terminal, which, as shown in FIG. 1, includes the following steps.

101: Analyze a spectral component of a voice signal during a call.

102: Select a corresponding frequency response channel according to an analysis result of the spectral component of the voice signal.

In the call method of a terminal that is provided by the embodiment of the present invention, during a call, a voice signal is processed at any time by using a frequency response channel of which a low frequency gain is smaller than a high frequency gain and a frequency response channel of which a low frequency gain is larger than a high frequency gain, so that high frequencies and low frequencies in the voice signal achieve a balance, so as to achieve a purpose of improving voice quality of a call. Therefore, a problem in the prior art that a user still needs to select or change a call mode before a call and during the call is avoided, which brings convenience to a call operation of the user.

Figure 2:
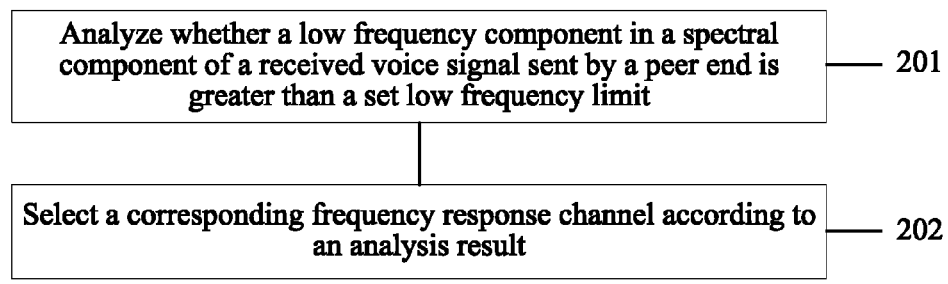
FIG. 2 is a flowchart of a call method of a terminal according to a second embodiment of the present invention.

A second embodiment of the present invention provides a call method of a terminal, which, as shown in FIG. 2, includes the following steps.

201: Analyze whether a value of a low frequency component in a spectral component of a received voice signal sent by a peer end is greater than a set low frequency limit.

The low frequency component is a frequency component lower than a set frequency point in the spectral component, and the set frequency point is a certain specific frequency value set by a manufacturer according to a voice frequency characteristic of a user. A set of frequencies lower than the set frequency point in the voice signal is the low frequency component, and a set of frequencies higher than the set frequency point is a high frequency component.

In this embodiment, the set low frequency limit is a limit defined by a manufacturer according to a distortion standard of 3GPP and a hardware characteristic of a UE, and because hardware compositions and hardware features of UEs of different types or models are not the same, a value of the set low frequency limit varies with different UEs.

That a frequency period is 5 seconds, a set frequency point is 300 Hz, and a set low frequency limit is 4 dBpa is taken as an example. In the 5 seconds, frequency components in a voice signal are divided according to the set frequency point, and all frequencies lower than 300 Hz form a low frequency component. If at least one of amplitudes of power density spectra of all frequencies in the low frequency component exceeds 4 dBpa, that is, exceeds the set low frequency limit, the low frequency component is greater than the set low frequency limit.

Values of the frequency period, the set frequency point, and the set low frequency limit in the foregoing example are not limited to the values in the example. That at least one amplitude exceeds the set low frequency limit is not the only criterion to determine whether a value of the low frequency component is greater than the set low frequency limit.

202: Select a corresponding frequency response channel according to an analysis result of the spectral component of the received voice signal sent by the peer end.

When the low frequency component is greater than the set low frequency limit, the voice signal is processed by using a frequency response channel of which a low frequency gain is smaller than a high frequency gain. When the low frequency component is less than the set low frequency limit, the voice signal is processed by using a frequency response channel of which a low frequency gain is larger than a high frequency gain, so as to achieve a purpose of balancing high frequencies and low frequencies.

In this embodiment, adjusting the low frequency component of the spectral component is taken as an example for illustration, and at the same time, in the present invention, a high frequency component in the spectral component may also be adjusted, and a set frequency point may be the same as the set frequency point in step 201. Whether a value of the high frequency component is greater than a set high frequency limit is analyzed according to the set high frequency limit, when the high frequency component is greater than the set high frequency limit, the voice signal is processed by using the frequency response channel of which a low frequency gain is larger than a high frequency gain, or when the high frequency component is less than the set high frequency limit, the voice signal is processed by using the frequency response channel of which a low frequency gain is smaller than a high frequency gain. Steps of adjusting the high frequency component are the same as step 201 and step 202 in this embodiment, which are not repeatedly described here.

In the call method of a terminal that is provided by the embodiment of the present invention, when a voice signal sent by a peer end is received, the voice signal is processed at any time by using a frequency response channel of which a low frequency gain is smaller than a high frequency gain and a frequency response channel of which a low frequency gain is larger than a high frequency gain, so that high frequencies and low frequencies in the voice signal achieve a balance, so as to achieve a purpose of improving voice quality of a call. Therefore, a problem in the prior art that a user still needs to select or change a call mode before a call and during the call is avoided, which brings convenience to a call operation of the user.

Figure 3:
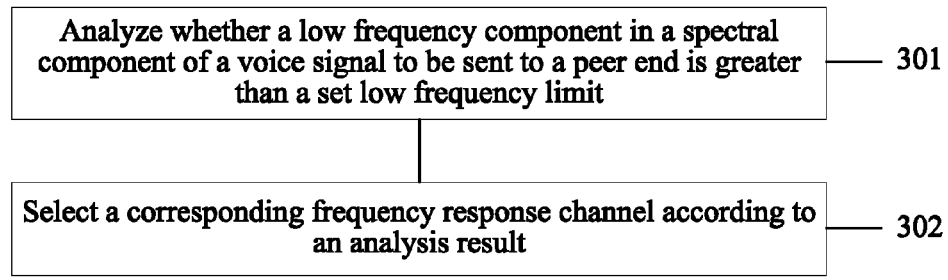
FIG. 3 is a flowchart of a call method of a terminal according to a third embodiment of the present invention.

A third embodiment of the present invention provides a call method of a terminal, which, as shown in FIG. 3, includes the following steps.

301: Analyze whether a value of a low frequency component in a spectral component of a voice signal to be sent to a peer end is greater than a set low frequency limit.

The low frequency component is a frequency component lower than a set frequency point in the spectral component, and the set frequency point is a certain specific frequency value set by a manufacturer according to a voice frequency characteristic of a user. A set of frequencies lower than the set frequency point in the voice signal is the low frequency component, and a set of frequencies higher than the set frequency point is a high frequency component.

In this embodiment, the set low frequency limit is a limit defined by a manufacturer according to a distortion standard of 3GPP and a hardware characteristic of a UE, and because hardware compositions and hardware features of UEs of different types or models are not the same, a value of the set low frequency limit varies with different UEs.

That a frequency period is 5 seconds, a set frequency point is 300 Hz, and a set low frequency limit is 4 dBpa is taken as an example. In the 5 seconds, frequency components in a voice signal are divided according to the set frequency point, and all frequencies lower than 300 Hz form a low frequency component. If at least one of amplitudes of power density spectra of all frequencies in the low frequency component exceeds 4 dBpa, that is, exceeds the set low frequency limit, the low frequency component is greater than the set low frequency limit.

Values of the frequency period, the set frequency point, and the set low frequency limit in the foregoing example are not limited to the values in the example. That at least one exceeds the set low frequency limit is not the only criterion to determine whether a value of the low frequency component is greater than the set low frequency limit.

302: Select a corresponding frequency response channel according to an analysis result of the spectral component of the voice signal to be sent to the peer end.

When the low frequency component is greater than the set low frequency limit, the voice signal is processed by using a frequency response channel of which a low frequency gain is smaller than a high frequency gain, and when the low frequency component is less than the set low frequency limit, the voice signal is processed by using a frequency response channel of which a low frequency gain is larger than a high frequency gain, so as to achieve a purpose of balancing high frequencies and low frequencies.

In this embodiment, adjusting the low frequency component in the spectral component is taken as an example for illustration, and at the same time, in the present invention, a high frequency component in the spectral component may also be adjusted, and a set frequency point may be the same as the set frequency point in step 301. Whether a value of the high frequency component is greater than a set high frequency limit is analyzed according to the set high frequency limit, when the high frequency component is greater than the set high frequency limit, the voice signal is processed by using the frequency response channel of which a low frequency gain is larger than a high frequency gain, or when the high frequency component is less than the set high frequency limit, the voice signal is processed by using the frequency response channel of which a low frequency gain is smaller than a high frequency gain. Steps of adjusting the high frequency component are the same as step 301 and step 302 in this embodiment, which are not repeatedly described here.

In the call method of a terminal that is provided by the embodiment of the present invention, before a voice signal is sent to a peer end, the voice signal is processed at any time by using a frequency response channel of which a low frequency gain is smaller than a high frequency gain and a frequency response channel of which a low frequency gain is larger than a high frequency gain, so that high frequencies and low frequencies in the voice signal achieve a balance, so as to achieve a purpose of improving voice quality of a call. Therefore, a problem in the prior art that a user still needs to select or change a call mode before a call and during the call is avoided, which brings convenience to a call operation of the user.

Figure 4:
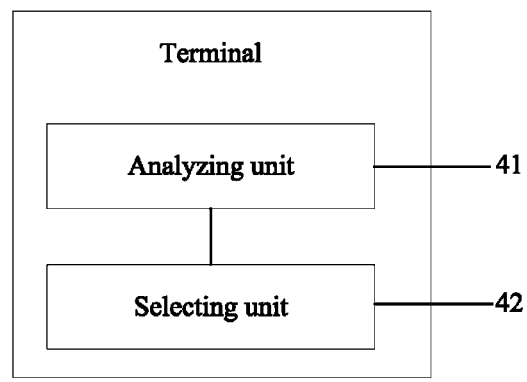
FIG. 4 is a schematic structural diagram of a terminal according to a fourth embodiment of the present invention.

A fourth embodiment provides a terminal, where, as shown in FIG. 4, the terminal includes an analyzing unit 41 and a selecting unit 42.

The analyzing unit 41 is configured to analyze a spectral component of a voice signal during a call.

The selecting unit 42 is configured to select a corresponding frequency response channel according to an analysis result of the spectral component of the voice signal.

The analyzing unit 41 is specifically configured to analyze a spectral component of a received voice signal sent by a peer end, or analyze a spectral component of a voice signal to be sent to a peer end.

Figure 5:
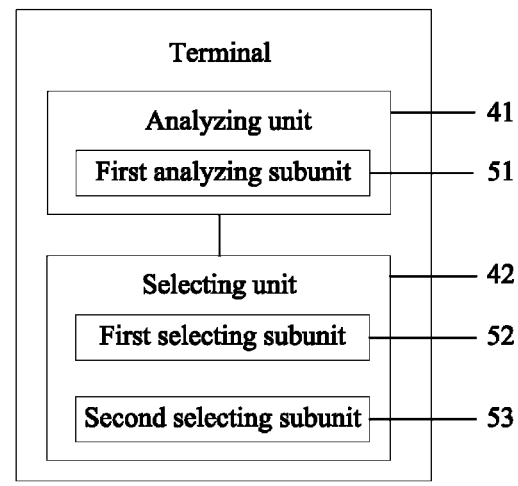
FIG. 5 is a schematic structural diagram of a terminal according to the fourth embodiment of the present invention.

Furthermore, as shown in FIG. 5, the analyzing unit 41 may further include: a first analyzing subunit 51.

The first analyzing subunit 51 is configured to analyze whether a value of a low frequency component in the spectral component of the voice signal is greater than a set low frequency limit, where the low frequency component is a frequency component lower than a set frequency point in the spectral component.

The selecting unit 42 may further include a first selecting subunit 52 and a second selecting subunit 53.

The first selecting subunit 52 is configured to, when the low frequency component in the spectral component of the voice signal is greater than the set low frequency limit, select a frequency response channel of which a low frequency gain is smaller than a high frequency gain for the voice signal.

The second selecting subunit 53 is configured to, when the low frequency component in the spectral component of the voice signal is less than the set low frequency limit, select a frequency response channel of which a low frequency gain is larger than a high frequency gain for the voice signal.

Figure 6:
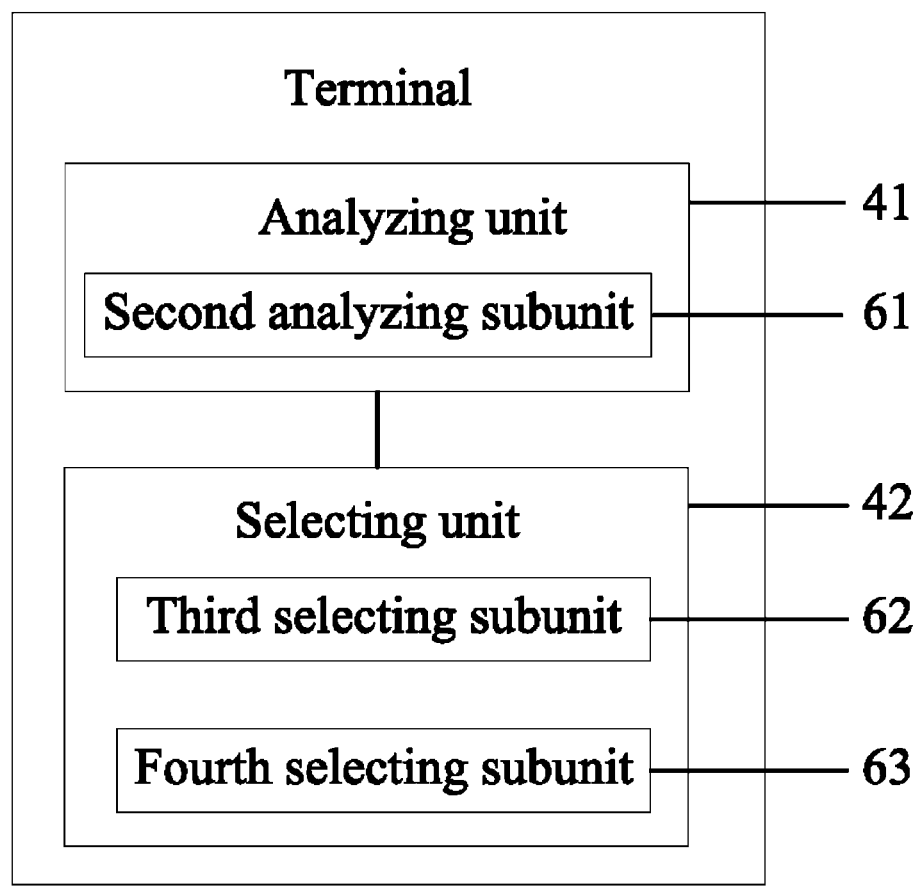
FIG. 6 is a schematic structural diagram of a terminal according to the fourth embodiment of the present invention.

Furthermore, as shown in FIG. 6, the analyzing unit 41 may further include a second analyzing subunit 61.

The second analyzing subunit 61 is configured to analyze whether a value of a high frequency component in the spectral component of the voice signal is greater than a set high frequency limit. The high frequency component is a frequency component higher than a set frequency point in the spectral component.

The selecting unit 42 may further include a third selecting subunit 62 and a fourth selecting subunit 63.

The third selecting subunit 62 is configured to, when the high frequency component in the spectral component of the voice signal is greater than the set high frequency limit, select a frequency response channel of which a low frequency gain is larger than a high frequency gain for the voice signal.

The fourth selecting subunit 63 is configured to, when the high frequency component in the spectral component of the voice signal is less than the set high frequency limit, select a frequency response channel of which a low frequency gain is smaller than a high frequency gain for the voice signal.

In the terminal provided by the embodiment of the present invention, during a call, a voice signal is processed at any time by using a frequency response channel of which a low frequency gain is smaller than a high frequency gain and a frequency response channel of which a low frequency gain is larger than a high frequency gain, so that high frequencies and low frequencies in the voice signal achieve a balance, so as to achieve a purpose of improving voice quality of a call. Therefore, a problem in the prior art that a user still needs to select or change a call mode before a call and during the call is avoided, which brings convenience to a call operation of the user.

Through the description of the foregoing embodiments, persons skilled in the art may clearly understand that the present invention may be implemented by software plus necessary universal hardware, and definitely may also be implemented by hardware, but in many cases, the former is a preferred implementation manner. Based on such understanding, the technical solutions of the present invention or the part contributing to the prior art may be essentially embodied in a form of a software product. The computer software product is stored in a readable storage medium, such as a floppy disk, a hard disk, or an optical disk of a computer, and includes several instructions for instructing a computer device (which may be a personal computer, a server, a network device, or the like) to execute the methods described in the embodiments of the present invention.

The foregoing description is merely specific implementation manners of the present invention, but is not intended to limit the protection scope of the present invention. Any variation or replacement made by persons skilled in the art within the technical scope disclosed in the present invention shall fall within the protection scope of the present invention. Therefore, the protection scope of the present invention shall be subject to the appended claims.

What is claimed is:

1. A call method of a terminal, the method comprising:
analyzing a spectral component of a voice signal during a call; and
selecting a corresponding frequency response channel from a plurality of frequency response channels according to an analysis result of the spectral component of the voice signal, the plurality of frequency response channels comprising:
a first frequency response channel of which a low frequency gain is smaller than a high frequency gain for the voice signal; and
a second frequency response channel of which a low frequency gain is larger than a high frequency gain.

2. The method according to claim 1, wherein analyzing the spectral component analyzing a spectral component of a received voice signal sent by a peer end.

3. The method according to claim 2, wherein analyzing the spectral component comprises analyzing whether a value of a low frequency component in the spectral component of the voice signal is greater than a set low frequency limit, wherein the low frequency component is a frequency component lower than a set frequency point in the spectral component.

4. The method according to claim 3, wherein selecting the corresponding frequency response channel comprises:
when the low frequency component in the spectral component of the voice signal is greater than the set low frequency limit, selecting the first frequency response channel; and
when the low frequency component in the spectral component of the voice signal is less than the set low frequency limit, selecting the second frequency response channel.

5. The call method of a terminal according to claim 3, wherein analyzing the spectral component comprises analyzing whether a value of a high frequency component in the spectral component of the voice signal is greater than a set high frequency limit, wherein the high frequency component is a frequency component higher than the set frequency point in the spectral component.

6. The method according to claim 5, wherein selecting the corresponding frequency response channel comprises:
when the high frequency component in the spectral component of the voice signal is greater than the set high frequency limit, selecting the first frequency response channel; and
when the high frequency component in the spectral component of the voice signal is less than the set high frequency limit, selecting the second frequency response channel.

7. The method according to claim 1, wherein analyzing the spectral component comprise analyzing a spectral component of a voice signal to be sent to a peer end.

8. The call method of a terminal according to claim 3, wherein analyzing the spectral component comprises analyzing whether a value of a low frequency component in the spectral component of the voice signal is greater than a set low frequency limit, wherein the low frequency component is a frequency component lower than a set frequency point in the spectral component.

9. The method according to claim 8, wherein selecting the corresponding frequency response channel comprises:
when the low frequency component in the spectral component of the voice signal is greater than the set low frequency limit, selecting the first frequency response channel; and
when the low frequency component in the spectral component of the voice signal is less than the set low frequency limit, selecting the second frequency response channel.

10. The method according to claim 8, wherein analyzing the spectral component comprise analyzing whether a value of a high frequency component in the spectral component of the voice signal is greater than a set high frequency limit, wherein the high frequency component is a frequency component higher than the set frequency point in the spectral component.

11. A terminal, comprising:
a processor; and
a computer-readable storage medium storing a program to be executed by the processor, the program including instructions for:
analyzing a spectral component of a voice signal during a call; and
selecting a corresponding frequency response channel from among a plurality of frequency response channels according to an analysis result of the spectral component of the voice signal, the plurality of frequency response channels comprising:
a first frequency response channel of which a low frequency gain is smaller than a high frequency gain for the voice signal; and
a second frequency response channel of which a low frequency gain is larger than a high frequency gain.

12. The terminal according to claim 11, wherein the program further includes instructions for analyzing a spectral component of a received voice signal sent by a peer end.

13. The terminal according to claim 12, wherein the program further includes instructions for analyzing whether a value of a low frequency component in the spectral component of the voice signal is greater than a set low frequency limit, wherein the low frequency component is a frequency component lower than a set frequency point in the spectral component.

14. The terminal according to claim 13, wherein the program further includes instructions for: selecting, when the low frequency component in the spectral component of the voice signal is greater than the set low frequency limit, the first frequency response channel; and
selecting, when the low frequency component in the spectral component of the voice signal is less than the set low frequency limit, the second frequency response channel.

15. The terminal according to claim 13, wherein the program further includes instructions for analyzing whether a value of a high frequency component in the spectral component of the voice signal is greater than a set high frequency limit, wherein the high frequency component is a frequency component higher than a set frequency point in the spectral component.

16. The terminal according to claim 15, wherein the program further includes instructions for:
selecting, when the high frequency component in the spectral component of the voice signal is greater than the set high frequency limit, the first frequency response channel; and
selecting, when the high frequency component in the spectral component of the voice signal is less than the set high frequency limit, the second frequency response channel.

17. The terminal according to claim 11, wherein the program further includes instructions for analyzing a spectral component of a voice signal to be sent to a peer end.

18. The terminal according to claim 17, wherein the program further includes instructions for analyzing whether a value of a low frequency component in the spectral component of the voice signal is greater than a set low frequency limit, wherein the low frequency component is a frequency component lower than a set frequency point in the spectral component.

19. The terminal according to claim 18, wherein the program further includes instructions for analyzing whether a value of a high frequency component in the spectral component of the voice signal is greater than a set high frequency limit, wherein the high frequency component is a frequency component higher than a set frequency point in the spectral component.

* * * * *